United States Patent
Khoo et al.

(10) Patent No.: US 9,231,693 B2
(45) Date of Patent: Jan. 5, 2016

(54) FULL DUPLEX INDIVIDUAL CALL VIA LINKED SINGLE FREQUENCY REPEATERS

(71) Applicant: MOTOROLA SOLUTIONS, INC, Schaumburg, IL (US)

(72) Inventors: Hun Weng Khoo, Gelugor (MY);
Thomas B Bohn, McHenry, IL (US);
Yueh Ching Chung, Georgetown (MY);
David G Wiatrowski, Woodstock, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 218 days.

(21) Appl. No.: 13/946,145

(22) Filed: Jul. 19, 2013

(65) Prior Publication Data

US 2015/0023226 A1 Jan. 22, 2015

(51) Int. Cl.
*H04J 3/08* (2006.01)
*H04B 7/212* (2006.01)
*H04L 5/14* (2006.01)
*H04W 72/12* (2009.01)
*H04B 7/155* (2006.01)
*H04W 84/04* (2009.01)

(52) U.S. Cl.
CPC .......... *H04B 7/2123* (2013.01); *H04B 7/15542* (2013.01); *H04L 5/14* (2013.01); *H04W 72/1263* (2013.01); *H04W 84/047* (2013.01)

(58) Field of Classification Search
None
See application file for complete search history.

(56) References Cited

U.S. PATENT DOCUMENTS

| 539,276 | A | * | 5/1895 | Lewin | ............................. 101/36 |
| 4,677,656 | A | | 6/1987 | Burke et al. | |
| 4,942,570 | A | * | 7/1990 | Kotzin et al. | .................. 370/263 |
| 5,231,629 | A | * | 7/1993 | Kotzin et al. | .................. 370/279 |
| 5,442,681 | A | * | 8/1995 | Kotzin et al. | .................. 455/450 |
| 5,790,527 | A | * | 8/1998 | Janky et al. | .................. 370/330 |
| 5,883,884 | A | * | 3/1999 | Atkinson | ..................... 370/279 |

(Continued)

FOREIGN PATENT DOCUMENTS

| EP | 292996 A2 | 11/1988 |
| EP | 778680 A1 | 6/1997 |

(Continued)

OTHER PUBLICATIONS

ETSI; Electromagnetic Compatibility and Radio Spectrum Matters (ERM); Digital Mobile Radio (DMR) General System Design; May 2, 2008; 69 Pages.

(Continued)

*Primary Examiner* — Kwang B Yao
*Assistant Examiner* — Juvena Loo
(74) *Attorney, Agent, or Firm* — Barbara R. Doutre (57) ABSTRACT

A method for enabling full duplex individual calls in repeater mode between two subscriber units (SUs) in a N:1 slotting ratio time division multiple access (TDMA) radio system includes receiving a request for a full duplex individual call from a first SU identifying a second SU as a target of the call. Determining to grant the request and subsequently assigning a first time slot of the N time slots on a first single frequency for one of inbound and outbound transmissions for the call between an assigned second repeater and the first SU and a second time slot on the first single frequency for the other of inbound and outbound transmissions for the call between the assigned second repeater and the first SU. Further, a grant message is transmitted to the first SU indicating the assigned first single frequency and assigned first and second time slots.

23 Claims, 6 Drawing Sheets

(56) References Cited

U.S. PATENT DOCUMENTS

| | | | |
|---|---|---|---|
| 5,974,034 A * | 10/1999 | Chin et al. | 370/328 |
| 5,974,325 A * | 10/1999 | Kotzin et al. | 455/450 |
| 6,014,375 A | 1/2000 | Janky | |
| 6,240,077 B1 * | 5/2001 | Vuong et al. | 370/330 |
| 6,810,022 B1 | 10/2004 | Young | |
| 8,274,933 B2 | 9/2012 | Henderson et al. | |
| 2002/0071415 A1 * | 6/2002 | Soulabail et al. | 370/337 |
| 2002/0142767 A1 * | 10/2002 | Mears et al. | 455/426 |
| 2004/0228292 A1 * | 11/2004 | Edwards | 370/277 |
| 2005/0201317 A1 * | 9/2005 | Bohn et al. | 370/320 |
| 2007/0263570 A1 | 11/2007 | Alapuranen et al. | |
| 2010/0279726 A1 | 11/2010 | Bohn et al. | |
| 2010/0309823 A1 | 12/2010 | Guha et al. | |
| 2011/0122851 A1 | 5/2011 | Gessner et al. | |
| 2012/0201173 A1 | 8/2012 | Jain et al. | |
| 2012/0264369 A1 | 10/2012 | Wang | |

FOREIGN PATENT DOCUMENTS

| | | | |
|---|---|---|---|
| EP | 2048822 A1 | 4/2009 | |
| EP | 2119133 B1 | 10/2012 | |
| EP | 1501322 B1 | 11/2012 | |
| GB | 2404307 A | 1/2005 | |
| WO | 9519071 A1 | 7/1991 | |
| WO | 9926362 A | 5/1999 | |
| WO | 0018052 A1 | 3/2000 | |
| WO | 0059138 A1 | 10/2000 | |
| WO | 2010039597 A2 | 4/2010 | |
| WO | 2012087926 A1 | 6/2012 | |

OTHER PUBLICATIONS

Motorola Solutions, Inc.; TDMA Technology—Bringing Increased Capacity and Functionality to Professional Digital Two-Way Radio; White Paper; 2012; 12 Pages.

Corresponding International Application No. PCT/US2014/046629—International Search Report Dated Oct. 23, 2014.

"Electromagnetic Compatibility and Radio Spectrum Matters (ERM); Digital Mobile Radio (DMR) Systems", Part 1 DMR AIR Interface (ai Protocol) Technical Report, (ETSI), F-06921 Sophia-Antipolis; France, vol. ERM TGDMR, No. V2.3.1, Jul. 2013.

Electromagnetic Compatibility and Radio Spectrum Matters (ERM); Digital Mobile Radio (DMR) Systems, General System Design, Technical Report, (ETSI), F-06921 Sophia-Antipolis; France, vol. ERM TGDMR, No. V1.3.1, Jul. 2013.

* cited by examiner

FULL DUPLEX INDIVIDUAL CALL VIA LINKED SINGLE FREQUENCY REPEATERS

BACKGROUND OF THE INVENTION

The European Telecommunications Standard Institute—Digital Mobile Radio (ETSI-DMR) is a direct digital replacement for analog Private Mobile Radio (PMR). DMR is a scalable system that can be used in unlicensed mode (in a 446.1 to 446.2 MHz band), and in licensed mode, subject to national frequency planning. Any of the ETSI standards or specifications referred to herein may be obtained by contacting ETSI at ETSI Secretariat, 650, route des Lucioles, 06921 Sophia-Antipolis Cedex, FRANCE.

DMR promises improved range, higher data rates, more efficient use of spectrum, and improved battery. Features supported include fast call set-up, calls to groups and individuals, short data and packet data calls. Supported communications modes include individual calls, group calls, and broadcast calls provided via a direct communication mode among the radios operating within the network. Other important DMR functions such as emergency calls, priority calls, short data messages and Internet Protocol (IP)-packet data transmissions are also supported.

The ETSI-DMR standard provides for 6.25e (2:1 TDMA) operation in repeater mode. 6.25e operation refers to 6.25 Kilohertz (kHz) equivalent spectral efficiency and 2:1 refers to the slotting ratio supported on the TDMA air interface, in this case supporting two repeating (e.g., recurring) interleaved time slots. As there is no restriction on what happens in either time slot or any interrelation between them (other than the need to maintain time synchronicity), it is possible to have two entirely separate conversations at the same time from two different units. By this means it is possible that two simplex calls can be independently supported in a single 12.5 kHz channel.

Figure 1:
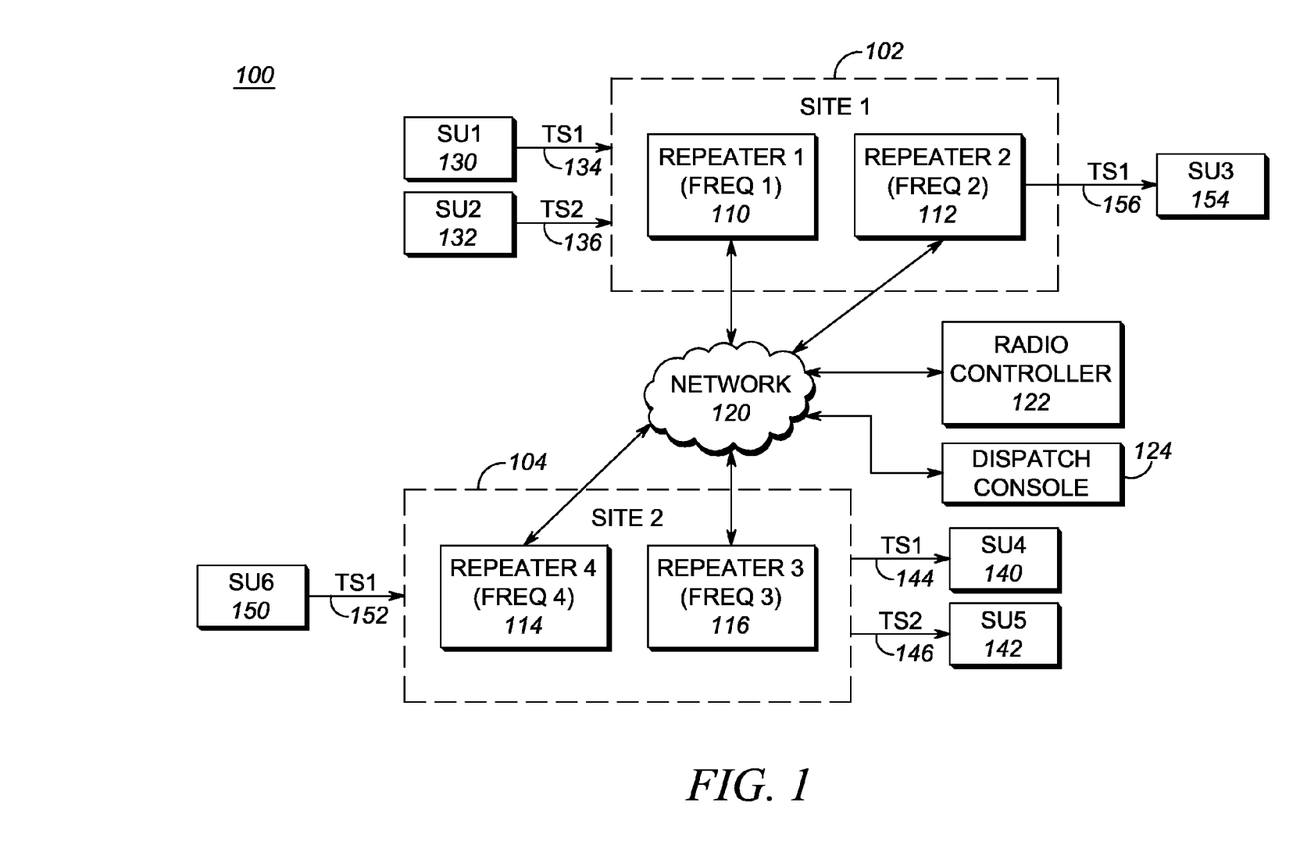
FIG. 1 is a block diagram of a conventional half duplex wireless communications system.

FIG. 1 illustrates an example half duplex radio system 100. In a half duplex radio system, voice and/or data moves in only one direction at a time (source to target(s)), as compared to full duplex, in which voice and/or data can move in both directions (e.g., source to target(s) and target(s) to source).

The radio system 100 includes two radio sites 102, 104 coupled via a network 120. In site 1 102, a first repeater (repeater1) 110 and a second repeater (repeater2) 112 provide communications services to subscriber units (SUs) SU1 130, SU2 132, and SU3 154. In radio site 2 104, a third repeater (repeater3) 116 and fourth repeater (repeater4) 114 provide communications services to SUs SU4 140, SU5 142, and SU6 150. A controller 122 may control operations at sites 1 and 2 (102, 104), including the assignment of control and/or traffic channels at those radio sites.

Each of the repeaters 110, 112, 114, 116 may operate as a conventional repeater or a trunked repeater. In a conventional radio system, a plurality of SUs are formed into groups. Each group uses an associated channel (shared or separate) for communication. Thus, each group is associated with a corresponding channel, and each channel can only be used by one group at any particular moment in time. In some systems, multiple groups may operate on the same channel, and may use a unique group ID embedded in the group communications to differentiate them. In a trunked radio system, SUs use a pool of channels for virtually an unlimited number of groups. Thus, all groups are served by all channels. For example, in a trunking system, all SUs operating at a radio site idle on an initial designated control channel and when a new call is requested over the control or rest channel, is assigned a new traffic channel for the new group call while remaining SUs not participating in the new group call stay on the initial designated control channel. In other trunked configurations, the control channel is converted to a traffic channel for the new call, and the SUs not participating in the new group call move to a newly assigned control channel. In still other trunked configurations, the control channel is converted to a traffic channel for the new call, and the SUs not participating in the new call stay on the control channel but do not participate (transmit or receive/unmute) in the new call.

Other conventional and trunked configurations are possible as well.

In an example consistent with the ETSI-DMR 6.25e standard, the radio system 100 may be a trunked radio system, and controller 122 may have assigned SU1 130 to timeslot one (TS1) 134 of a 2:1 slot ratio TDMA first inbound frequency (frequency1) being served by repeater1 110 and may have assigned SU2 132 to timeslot two (TS2) 136 on the same frequency1. Further, controller 122 may have assigned SU3 154 to TS1 156 of a 2:1 slot ratio TDMA second outbound frequency (frequency2) being served by repeater2 112. The controller 122 may have also assigned SU4 140 and SU5 142, respectively, to TS1 144 and TS2 146 of a same 2:1 slot ratio TDMA third outbound frequency (frequency3) being served by repeater3 116. Finally, the controller 122 may have assigned SU6 150 to TS1 152 of a 2:1 slot ratio TDMA fourth inbound frequency (frequency4) being served by repeater4 114. In this example, SU1 130 may be transmitting voice data to SU4 via TS1 134 and TS1 144, SU2 132 may be transmitting voice data to SU5 142 via TS2 136 and TS2 146, and SU6 150 may be transmitting voice data to SU3 154 via TS1 152 and TS1 156. Voice and/or data received from SUs may be exchanged between repeaters 110-116 via interconnection network 120. The dispatch console 124 may operate as a client of the radio system 100, and provides a mechanism for a dispatcher to transmit or receive with one or more SUs at radio sites 1 and/or 2.

Although not illustrated in FIG. 1, additional control channel repeaters and respective control channels may be provided at each site 102, 104 as well. In other embodiments, one of the repeaters at each site (e.g., perhaps repeater1 110 and repeater3 116) may have acted as a control channel repeater prior to transitioning to a traffic channel repeater (trunked or single frequency repeater (SFR)) to handle a requested call.

In any event, and as illustrated, by providing an N:1 slotting ratio, wherein N>1, an assigned conventional or trunked traffic channel may allow a repeater such as repeater1 110 to receive or transmit voice and/or data for more than one call (up to N) on each frequency channel on which it is operating. In the example set forth in FIG. 1, repeater1 110 and repeater3 116 are each handling two calls on single respective frequencies in accordance with ETSI-DMR standard 2:1 slotting ratio.

In conventional repeater systems, separate frequencies are assigned for outbound (repeater→SU) and inbound (SU→repeater) transmissions. For example, to support full duplex calls for SU1 130, a fifth repeater (not shown) would need to be added to FIG. 1 that is time synchronized with repeater1 110 and that is assigned a fifth frequency that does not interfere with frequency1. Inbound traffic could then be sent to the fifth repeater by SU1 130 during TS1 on frequency1 and outbound traffic could then be sent to SU1 130 during TS2 on the fifth frequency. However, given the short guard intervals (~2.5 ms) between time slots in accordance with the ETSI-DMR 6.25e standard, a typical SU cannot switch between frequency1 of repeater1 110 to transmit on TS1 and the fifth frequency of the fifth repeater to receive on TS2 within the time allotted under the standard. While the incorporation of a second synthesizer in the SU could alleviate some of the difficulty, the addition of a second independent synthesizer substantially increases the cost to manufacture a SU, the size and weight of the SU, and the power drain on the battery of the SU.

Figure 2:
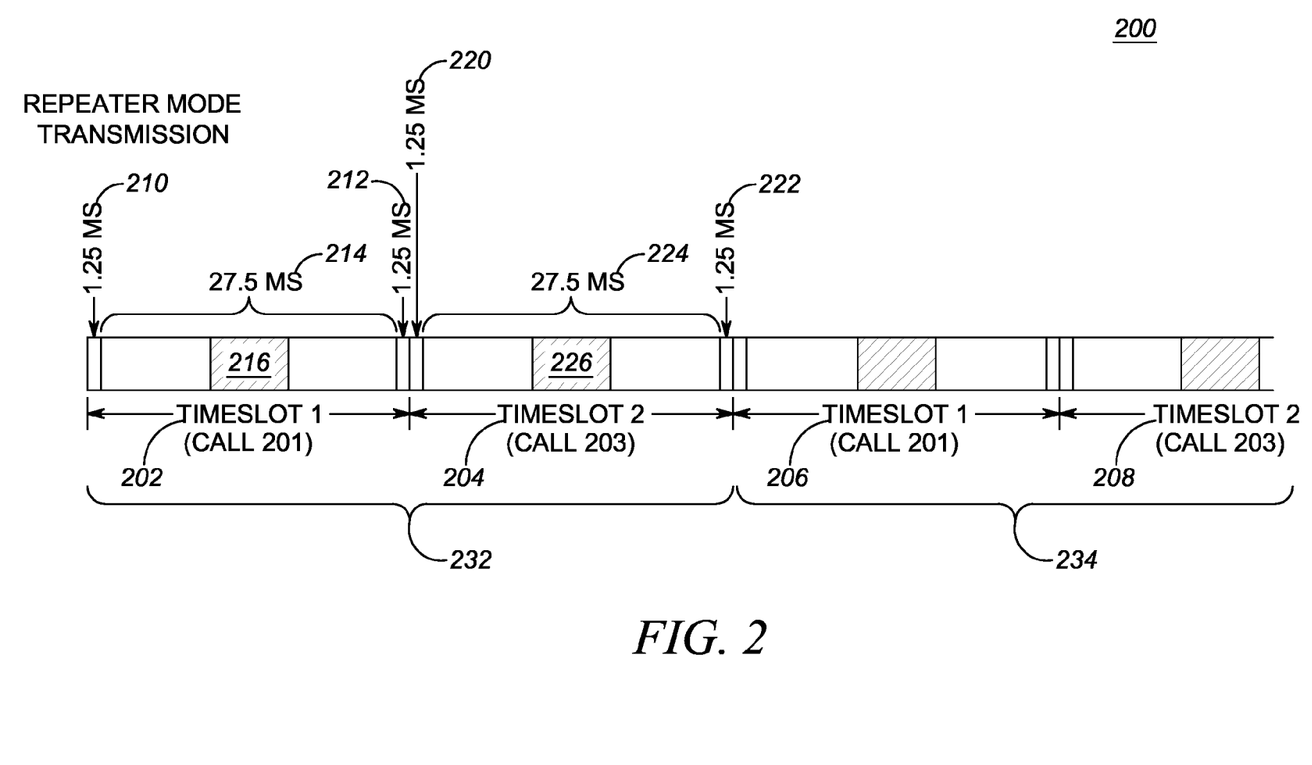
FIG. 2 is a timing diagram illustrating inbound call transmissions over a conventional 2:1 ETSI-DMR air interface.

FIG. 2 illustrates an example 2:1 TDMA timing diagram 200 of a single inbound frequency air interface, such as that provided by repeater1 110, that operates in accordance with the ETSI-DMR 6.25e standard. Timeslot 1 202 includes 1.25 ms guard intervals 210, 212 and a 27.5 ms payload period 214 that includes a sync slot 216. Timeslot 2 204 similarly includes 1.25 ms guard intervals 220, 222 and a 27.5 ms payload period 224 that includes a sync slot 226. Timeslots 1 and 2 then repeat in an interleaved manner as illustrated in FIG. 2, including a second timeslot 1 206 for use by a same call 201 as used in timeslot 1 202, and another timeslot 2 208 for use by a same call 203 as used in timeslot 2 204, repeating in an interleaved manner until one or both calls end. Timeslots 1 202 and 2 204 together form a first frame 232, and timeslots 1 206 and 2 208 together form a second frame 234. Timeslot 1 202 could be, for example, equivalent to TS1 134 of FIG. 1 and may support a call 201 from SU1 130, and timeslot 2 204 could be, for example, equivalent to TS2 136 of FIG. 1 and may support a concurrent inbound call 203 from SU2 132.

What is needed is an improved method, system, and device for providing full duplex voice and data communications services in N:1 TDMA communications systems that does not require each SU to switch its synthesizer between a transmit frequency and a receive frequency (where the frequencies are different), and vice versa, within an amount of time between adjacent slots in the N:1 TDMA protocol.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An improved method, system, and device for providing full duplex voice and data communications services in N:1 TDMA communications systems is disclosed that does not require each SU to switch its synthesizer between a transmit frequency and a receive frequency (where the frequencies are different), and vice versa, within an amount of time between adjacent slots in the N:1 TDMA protocol.

In accordance with a first embodiment, a method for enabling full duplex individual calls in repeater mode between two subscriber units in a N:1 slotting ratio time division multiple access (TDMA) radio system includes: receiving, at a first repeater, a request for a full duplex individual call from a first subscriber unit identifying a second subscriber unit as a target of the full duplex individual call, determining, by a radio controller associated with the first repeater, whether to grant or deny the request, and responsive to determining to grant the request: assigning, by the radio controller, a first time slot of N time slots on a second single frequency for one of inbound and outbound transmissions for the full duplex individual call between an assigned third repeater and the second subscriber unit and a second time slot of the N time slots on the second single frequency for the other of inbound and outbound transmissions for the full duplex individual call between the assigned third repeater and the second subscriber unit, and causing, by the radio controller, a grant message to be transmitted to the second subscriber unit indicating the assigned second single frequency and assigned first and second time slots.

In accordance with a second embodiment, a radio controller device for enabling full duplex individual calls in repeater mode between two subscriber units in a N:1 slotting ratio time division multiple access (TDMA) radio system includes: a transceiver, a memory and a processor configured to: receive, via a first repeater and the transceiver, a request for a full duplex individual call from a first subscriber unit identifying a second subscriber unit as a target of the full duplex individual call, determine whether to grant or deny the request, and responsive to determining to grant the request: assign a first time slot of the N time slots on a first single frequency for one of inbound and outbound transmissions for the full duplex individual call between an assigned second repeater and the first subscriber unit and a second time slot of the N time slots on the first single frequency for the other of inbound and outbound transmissions for the full duplex individual call between the assigned second repeater and the first subscriber unit, and cause a grant message to be transmitted, via the transceiver and the first repeater, to the first subscriber unit indicating the assigned first single frequency and assigned first and second time slots.

In accordance with a third embodiment, a method for enabling full duplex individual calls in repeater mode between a dispatch console and a subscriber unit in a N:1 slotting ratio time division multiple access (TDMA) radio system includes: receiving, at a radio controller, a request for a full duplex individual call from a dispatch console identifying a first subscriber unit as a target of the full duplex individual call, determining, by the radio controller, whether to grant or deny the request, and responsive to determining to grant the request: assigning, by the radio controller, a first time slot of the N time slots on a first single frequency for one of inbound and outbound transmissions for the full duplex individual call between an assigned first repeater and the first subscriber unit and a second time slot of the N time slots on the first single frequency for the other of inbound and outbound transmissions for the full duplex individual call between the assigned first repeater and the first subscriber unit, causing, by the radio controller, a grant message to be transmitted to the first subscriber unit indicating the assigned first single frequency and assigned first and second time slots.

Each of the above-mentioned embodiments will be discussed in more detail below, starting with example device and network architectures of the system in which the embodiments may be practiced, followed by a discussion of full duplex call setup and transmission from a device and system perspective. Further advantages and features consistent with this disclosure will be set forth in the following detailed description, with reference to the figures.

I. Device and Network Architectures

Figure 3:
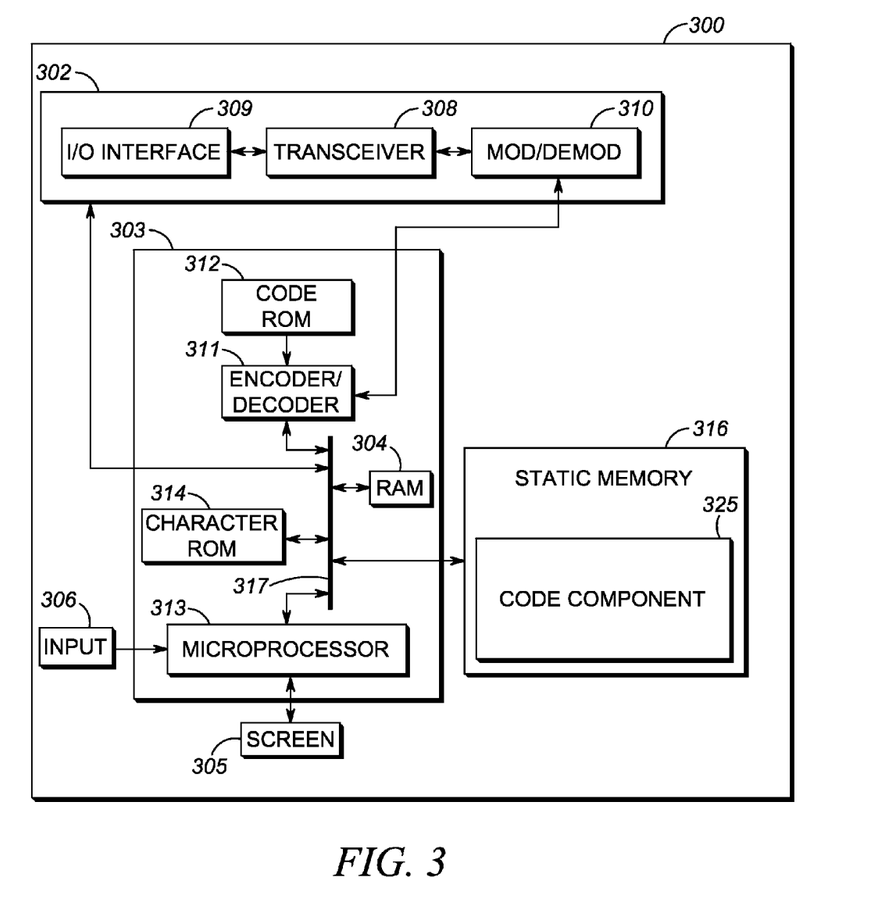
FIG. 3 is a block diagram illustrating a communications computing device in accordance with an embodiment.

FIG. 3 is an example functional block diagram of a communications computing device 300 operating within a radio system in accordance with some embodiments. The communications computing device 300 may operate as a separate device and may control one or more radio sites and their repeater stations via one or more network connections, or may be integrated with or across one or more of the repeaters at one or more radio sites. The communications computing device 300 may control the assignment and/or function of SFRs for requested full duplex calls in response to receiving a full duplex call request, and may operate in a trunked or a conventional radio system. Further details regarding communications computing device 300 operation will be discussed with respect to FIGS. 4-6.

As shown in FIG. 3, communications computing device 300 includes a communications unit 302 coupled to a common data and address bus 317 of a processing unit 303. The communications computing device 300 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between repeaters, radio controllers, or SUs in a radio system. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate with radio controllers, repeaters, SUs, other infrastructure devices, and/or with a dispatch console.

The communications unit 302 may include one or more wireless transceivers 308, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. In one embodiment, the communication unit 302 may contain a single direct conversion transceiver that does not require synthesizer reprogramming when switching between a receive mode and a transmit mode on a same single frequency or may contain a VLIF transceiver where synthesizer reprogramming is needed but can be completed within the allotted 2.5 ms time period under the ETSI-DMR standard.

The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control channel messages, full duplex call request messages, and/or data or voice messages that may be transmitted or received by the communications computing device 300. Static memory 316 may store operating code 325 for the microprocessor 313 that, when executed, performs one or more of the radio controller functions or message transmissions, SU functions or message transmissions, or SFR functions or message transmissions set forth in FIGS. 5 and 6 and corresponding text. Static memory 316 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 4:
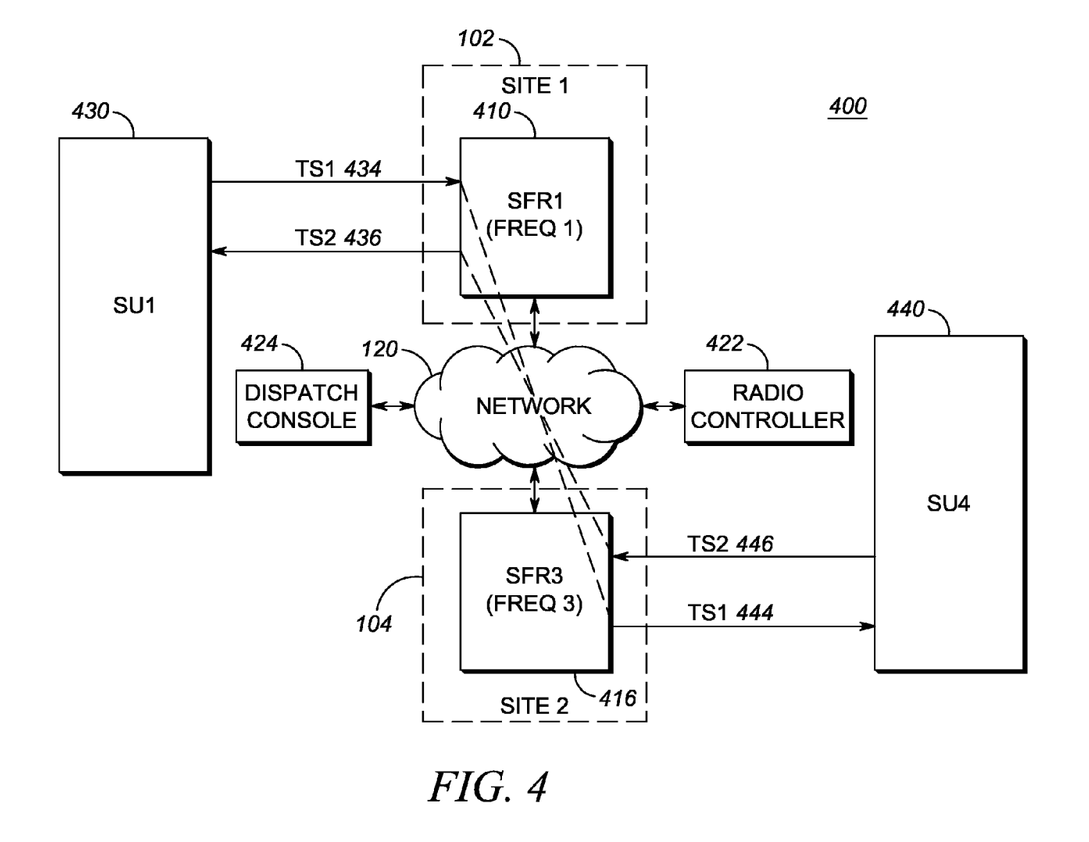
FIG. 4 is a block diagram of a set of single frequency repeaters supporting a full duplex call in accordance with an embodiment.

Referring now to FIG. 4, disclosed is an example of a full duplex capable radio communications system 400 including a plurality of SFRs for supporting a full duplex call in accordance with some embodiments. Similar to FIG. 1, two radio sites 102 and 104 are provided, which may be geographically non-overlapping, partially overlapping, or fully overlapping. Single frequency repeater one (SFR1) 410 may be a separate repeater from repeater1 110 of FIG. 1 (e.g., not shown in FIG. 1), or may be repeater1 110 (e.g., converted from a conventional or trunked repeater to a SFR). Single frequency repeater three (SFR3) 416 may be a separate repeater from repeater3 116 of FIG. 1 (e.g., not shown in FIG. 1), or may be repeater3 116 (e.g., converted from a conventional or trunked repeater to a SFR). SFRs 1 410 and 3 416 may have a structure that is the same as, or similar to, communications computing device 300 of FIG. 3.

SU1 430 of FIG. 4 may be the same SU1 130 of FIG. 1, or may be a separate SU from SU1 130 of FIG. 1 (e.g., not shown in FIG. 1). SU4 440 may be the same SU4 140 of FIG. 1, or may be a separate SU from SU4 140 of FIG. 1 (e.g., not shown in FIG. 1). SUs 1 430 and 4 440 may have a structure that is the same as, or similar to, communications computing device 300 of FIG. 3.

Radio controller 422 may be a trunked or conventional radio controller and may be a separate device as illustrated, or may be alternately integrated with or distributed across one or more repeaters such as SFRs 1 410 and 3 416 of FIG. 4. Radio controller 422 may have a structure that is the same as, or similar to, communications computing device 300 of FIG. 3. The dispatch console 424 may operate as a client of the full duplex capable radio system 400, and provides a mechanism for a dispatcher to transmit or receive full duplex communications with an SU at radio site 1 102 and/or 2 104.

As shown in FIG. 4, in response to receiving a request for a full duplex call, radio controller 422 assigns a SFR a single frequency on which to provide both inbound and outbound transmissions between SU and repeater via two of the N available TDMA slots on the air interface between the SFR and the SU. For example, in a radio system implementing the 2:1 TDMA protocol of the 6.25e ETSI-DMR standard, inbound and outbound time slots are immediately adjacent one another. Other protocols including other time slot ratios could result in systems in which the inbound and outbound time slots are not immediately adjacent one another, but are offset by one or more intervening used or unused time slots.

In one example in which the repeater1 110 of FIG. 1 is converted to the SFR1 410 of FIG. 4 and the repeater3 116 of FIG. 1 is converted to the SFR3 416 of FIG. 4 to support a full duplex call between SU1 130/430 and SU4 140/440, TS2 136 that was previously available to support an additional inbound call from SU2 132 may be converted (assuming it is not currently in use) to an outbound TS2 436 for supporting the full duplex call, while TS1 134 (on the same single frequency as TS2 136) remains available as the inbound time slot for the requested full duplex call. Similarly, TS2 146 that was previously available to support an additional outbound call to SU5 146 may be converted (again, assuming it is not currently in use) to an inbound TS2 446 for supporting the full duplex call, while TS1 144 (on the same single frequency as TS2 146) remains available as the outbound time slot for the requested full duplex call between SU1 130/430 and SU4 140/440.

Voice and/or data received by SFR1 410 in TS1 434 can then be forwarded to SFR3 416 via network 120 and transmitted out to SU4 440 on the next available TS1 444. Voice and/or data received by SFR3 in TS2 446 can then be forwarded to SFR1 410 via network 120 and transmitted out to SU1 430 on the next available TS2 436. With reference to FIG. 2, timeslot 1 202 for a call 201 (e.g., half of the full duplex call between SU1 430 and SU4 440) can be mapped to TS1 434 of FIG. 4, while timeslot 204 for a call 203 (e.g., the other half of the same full duplex call between SU1 430 and SU4 440) can be mapped to TS2 436 of FIG. 4. At the same time, similar timeslots to timeslots 1 202 and 2 203 of FIG. 1 can be mapped to TSs 1 444 and 2 446 of FIG. 4 to carry traffic between SU4 440 and SFR3 416.

Advantageously, by refraining from adding another repeater to support a full duplex call on an additional second frequency as set forth with respect to FIG. 1 above and refraining from adding a second synthesizer to the SUs, but instead using a reserved SFR or converted SFR to conduct both inbound and outbound transmissions across (potentially immediately adjacent) time slots of a same single frequency, costly additional synthesizers do not need to be added and remaining single synthesizers no longer are required to switch frequencies within an amount of time between adjacent slots in the a N:1 TDMA protocol. As a result, full duplex calls can be made between SUs via linked intermediary SFRs at reduced costs and complexity.

II. Full Duplex Call Setup and Transmission Processes

Figure 5:
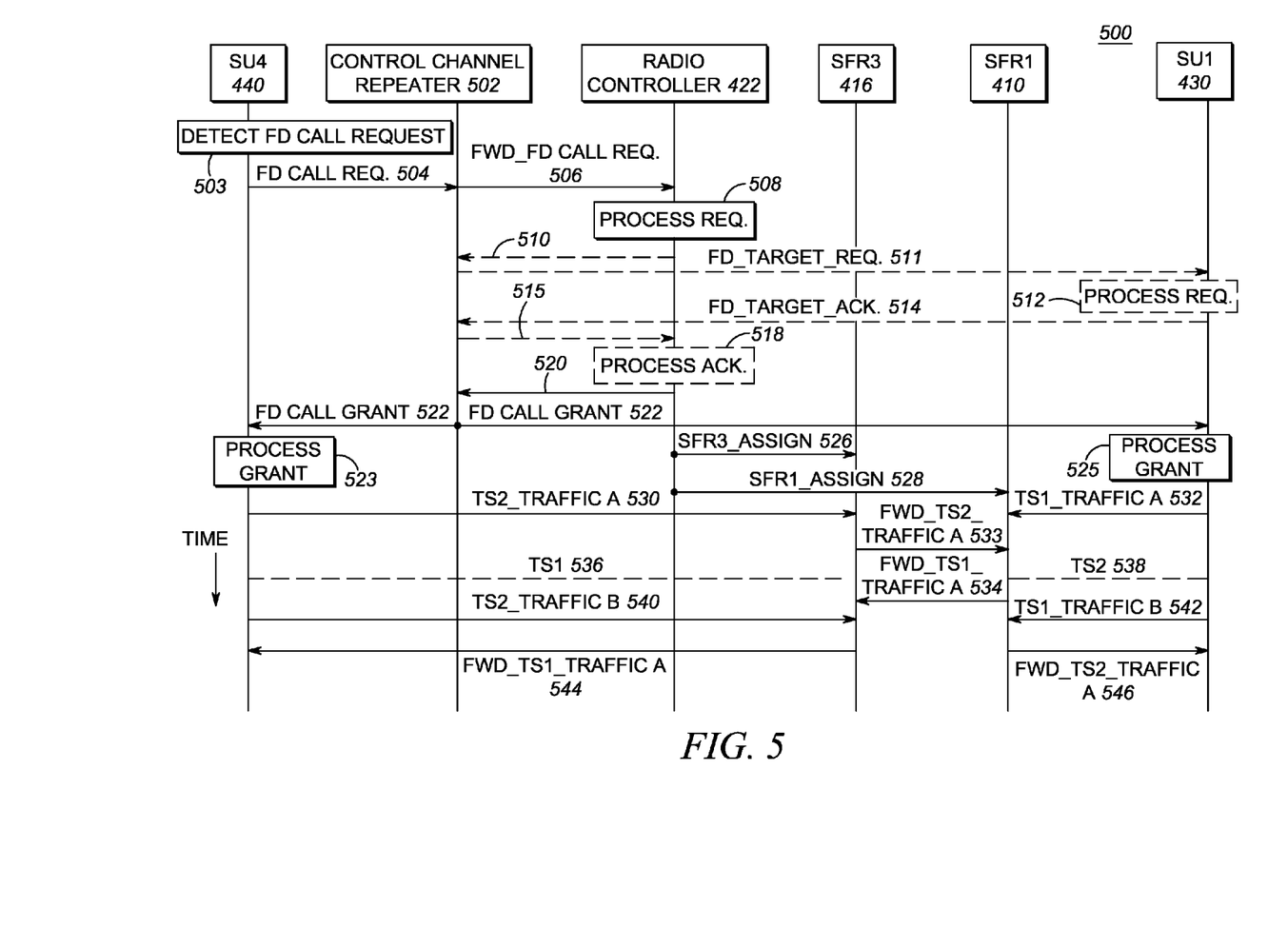
FIG. 5 is a ladder diagram illustrating full duplex call setup and transmission in an example trunked radio system.
Figure 6:
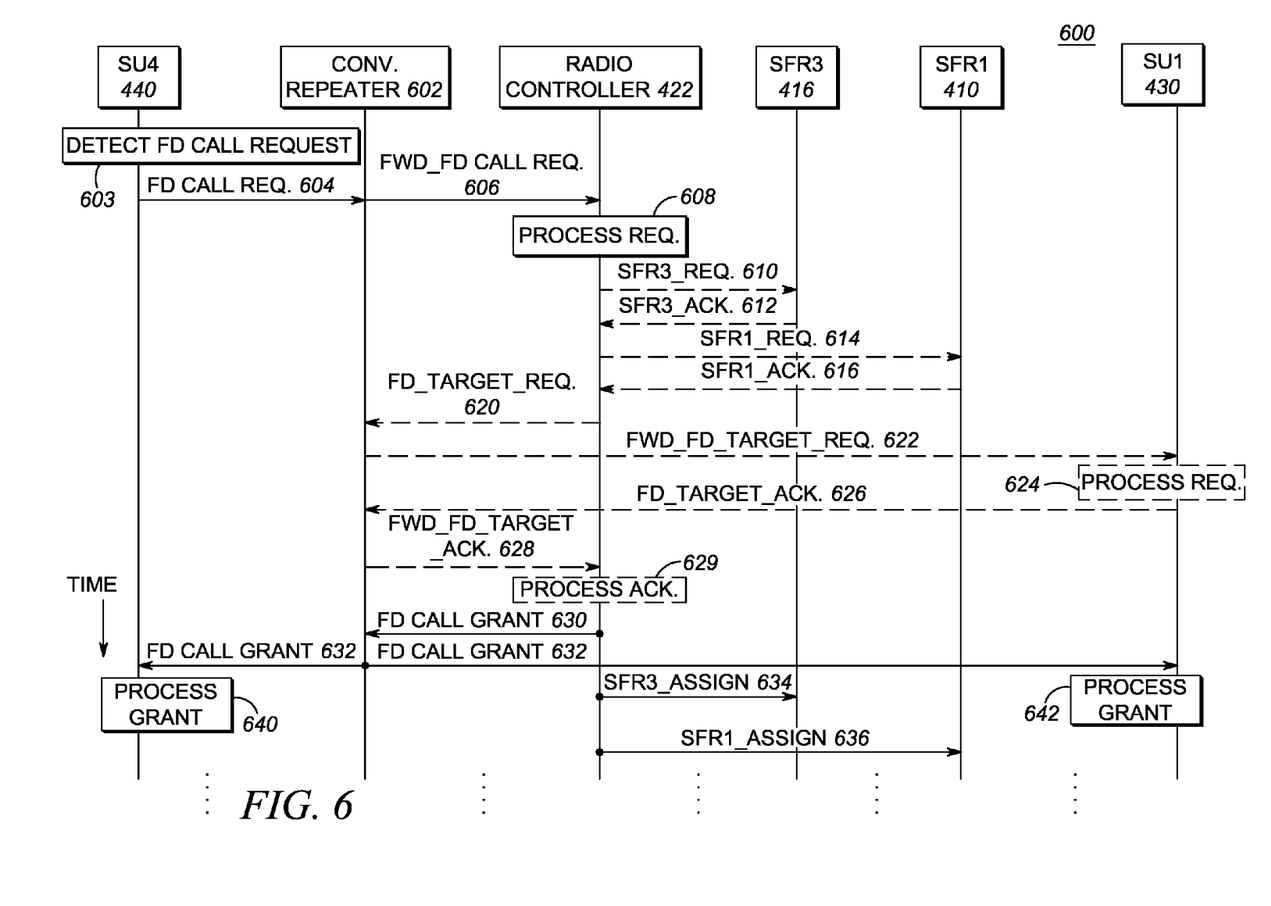
FIG. 6 is a ladder diagram illustrating full duplex call setup and transmission in an example conventional radio system.

FIGS. 5-6 set forth example message flows of a full duplex call setup and transmission process that may be executed at a radio controller and other radio system devices in accordance with some embodiments. In the examples set forth in detail below, only particular sequences are disclosed with respect to the radio controller, SFRs, and SUs. Of course, additional steps or message transmissions not disclosed herein could be additionally added before, after, or in-between processing steps or message transmissions disclosed in FIGS. 5 and 6, and the presence of such additional steps or message transmissions would not negate the purpose and advantages of the full duplex call setup and transmissions examples set forth in detail throughout the remainder of this disclosure.

FIG. 5 sets forth a ladder diagram 500 illustrating example message transmissions and processing steps executable in a radio system such as radio system 400 of FIG. 4. For ease of describing the embodiments hereinafter, the digital conventional wireless communications system in which message transmissions and processing steps are illustrated in FIG. 5 (and FIG. 6, for that matter) is presumed to be a two time slot (2:1) TDMA trunked radio communications system in accordance with the ETSI-DMR 6.25e standard. Thus, in the embodiments described below, since there are two time slots, there are two channels available on each radio frequency for carrying control or traffic payloads in the system. For example, in one embodiment consistent with the ETSI-DMR standard for repeater-based communications, a time slot has a length of thirty milliseconds (30 ms) and is numbered "1" or "2". Of course, in other embodiments, different slotting ratios, different slot lengths, and different slot numbering conventions could be used.

FIG. 5 illustrates a full duplex individual call setup and transmission process in a trunked radio system initiated by SU4 440 of FIG. 4, with SU1 430 indicated as an intended recipient of the full duplex call. While multiple additional SUs may be able to receive or monitor the full duplex call (e.g., by monitoring time slots TS1 and TS2 at site 1 102 or site 2 104), the additional SUs would not be able to participate in the call due to the limited availability of time slots in this example. Accordingly, systems and devices involved in the full duplex individual call setup and transmission process include, but are not limited to, SU4 440, control channel repeater 502, radio controller 422, SFR3 416, SFR1 410, and SU1 430. In one embodiment, and as mentioned earlier, control channel repeater 502 may be a separate repeater from the SFRs or other traffic channel repeaters illustrated in FIG. 4 that is dedicated to providing the control channel for the respective radio sites 1 102 and/or 2 104. In other embodiments, control channel repeater 502 may transition to and act as one of the SFRs SFR1 410 or SFR3 416 for the full duplex call in response to receiving and granting the full duplex call request. Furthermore, while in this example a single control channel repeater 502 is illustrated that provides control channel coverage over both radio sites 1 102 and 2 104 (which may be separate or fully or partially overlapping), in other embodiments, separate control channel repeaters may be installed at each radio site 1 102 and 2 104, and may coordinate SFR assignments, if necessary, for a requested full duplex call via a network such as network 120. Other possibilities exist as well.

At step 503, the SU4 440, perhaps while idling on a control channel provided by control channel repeater 502, detects a request for a full duplex call with SU1 430, perhaps received via an input interface of the SU4 440. In response to detecting the request, the SU4 440 generates and transmits a full duplex call request message (FD_Call_Req 504) on the control channel for receipt by control channel repeater 502. Control channel repeater 502 then forwards the request via a FWD_FD_Call_Req 506 message to radio controller 422, via a network connection such as network 120, or via an internal software function interface or internal circuit element in the event that radio controller 422 is integrated with the control channel repeater 502.

At step 508, the radio controller 422 processes the FWD_FD_Call_Req 506 message, identifying the source SU4 440 identified in the request, the target SU1 430 identified in the request, and an indication that the call request is for a full duplex call (and not a half duplex call). For example, the indicator may be a particular bit setting in a particular designated full duplex voice call request field of an ETSI-DMR 6.25e voice header, or may be a separate opcode in the existing opcode field of the voice header. Other possibilities exist as well.

In one optional embodiment, the radio controller 422 may, at step 508 and prior to granting the request, confirm that the indicated target SU (SU1 430) is available and willing to accept the full duplex call. For example, and as illustrated in FIG. 5, the radio controller 422 may transmit a full duplex target request message (FD_target_req 510/511) to SU1 430 via the control channel repeater 502 and corresponding control channel. In response to receiving the request, the SU1 430 may process the request at optional step 512. For example, SU1 430 may query its user via a display prompt and request the user to indicate whether to accept or reject the full duplex call request. In other embodiments, SU1 430 may be configured to determine, automatically, and perhaps via consideration of the SU1's 430 operating environment, whether to accept or reject the call and respond accordingly.

In any event, and assuming that the SU1 430 user or SU1 430 itself determines to accept the call, it transmits a full duplex target acknowledgment message (FD_target_ack 514/515) on the control channel to radio controller 422 via control channel repeater 502. Radio controller 422 may then use the acknowledgment, or lack thereof, at optional step 518 in further determining whether to grant the requested full duplex call.

Also at step 508, radio controller 422 may determine whether sufficient available radio frequency (RF) resources exist to grant the full duplex call. Because the full duplex call consumes two time slots that could normally be used to support two separate half duplex calls at a particular site, radio controller 422 must determine whether each site involved in the full duplex call has sufficient resources (two timeslots in this case) on a single frequency to support the full duplex call. In an embodiment in which specialized SFRs are reserved for full duplex calls, the radio controller 422 may determine whether a reserved SFR is available at each radio site involved in the full duplex call (or two SFRs at a single radio site in an embodiment in which radio site 1 102 and radio site 2 104 are the same radio site). In an embodiment where trunked half duplex repeaters are converted to SFRs for a full duplex call, the radio controller 422 must determine whether a trunked half duplex repeater with two free timeslots is available to be converted to a SFR to support the full duplex call. In some embodiments, the radio controller 422 may track repeater usage and may be able to determine, itself, whether sufficient resources are available to support the full duplex call. In other embodiments, the radio controller 422 may need to poll one or more repeaters and/or SFRs to determine or verify that the required RF resources are available Assuming that the radio controller 422 determines that sufficient resources are available for the call (e.g., in this case, that SFR3 416 can operate on a single frequency having two immediately adjacent timeslots available for the full duplex call at radio site 104, and that SFR1 410 can operate on a single frequency having two immediately adjacent timeslots available for the full duplex call at radio site 102), the radio controller 422 causes a full duplex call grant message to be broadcast on the control channel (e.g., a FDCallGrant 520 message generated by radio controller 422 and broadcast by the control channel repeater 502 as FDCallGrant 522). The FDCallGrant 520/522 message includes information populated by the radio controller 422 that identifies the frequency and time slots that each party to the full duplex call should receive and transmit on, respectively, for the duration of the full duplex call. For example, and using the radio system illustrated in FIG. 4, the FDCall Grant 520/522 may instruct SU4 440 to tune to frequency3 associated with SFR3 416 and to transmit voice and/or data to SFR3 416 on TS2 446 on frequency3 and to receive voice and/or data from SFR3 416 on TS1 444 on frequency3. Similarly, the FDCall Grant 520/522 may instruct SU1 430 to tune to frequency1 associated with SFR1 410 and to transmit voice and/or data to SFR1 410 on TS1 434 on frequency1 and to receive voice and/or data from SFR1 411 on TS2 436 on frequency1. Once so instructed, the SUs (SU4 440 and SU1 430) may tune to the assigned frequency, and synchronize with their respective SFR via a synchronization code transmitted in an outbound sync slot from each SFR. The synchronization code may be used to identify the slot in which it was transmitted, and using this information along with the assigned slot information and known timing of the channel, can begin transmitting and/or receiving in the corresponding correct time slot. Other ways of identifying a slot could be used as well.

In an embodiment in which separate control channel repeaters are provided for each radio site, separate call grant messages may be broadcast at each radio site containing all of the information as set forth in the FDCallGrant 520/522 message, or only that information relevant to the radio site in which it is broadcast. Other possibilities exist as well.

The radio controller 422 also transmits frequency and timeslot assignment messages to each SFR involved in the full duplex call. For example, radio controller 422 may transmit SFR3_assign message 526 to SFR3 416 instructing SFR3 416 to tune to frequency3 and to transmit voice and/or data to SU4 440 on TS1 444 on frequency3 and to receive voice and/or data from SU4 440 on TS2 446 on frequency3. The SFR3_assign message 526 (or a separately transmitted message) may also include peer information that allows the SFR3 416 to identify what other SFR (SFR1 410 in this case) peer it should be transmitting voice and/or data to and/or from via the network 120.

Immediately after tuning to frequency3, if not already tuned to frequency3, SFR3 may then begin broadcasting at least the sync portion of TS1 444 (see, for example, sync slot 216 of FIG. 2) that would allow the SU4 440, if not already synchronized to SFR3 416, to identify TS1 444 via its unique sync code transmitted by SFR3 416 in the sync slot and to synchronize to SFR3 416 so it can calculate a timing offset and know when to start transmitting inbound voice and/or data on TS2 446.

Similarly, radio controller 422 may transmit SFR1_assign message 528 to SFR1 410 instructing SFR1 410 to tune to frequency1 and to transmit voice and/or data to SU1 430 on TS2 436 on frequency1 and to receive voice and/or data from SU1 430 on TS1 434 on frequency1. The SFR1_assign message 528 (or a separately transmitted message) may also include peer information that allows the SFR1 410 to identify what other SFR (SFR3 416 in this case) peer it should be transmitting voice and/or data to and/or from via the network 120.

Immediately after tuning to frequency1, if not already tuned to frequency1, SFR1 may then begin broadcasting at least the sync portion of TS2 436 that would allow the SU1 430, if not already synchronized to SFR1 410, to identify TS2 436 via its unique sync code transmitted by SFR1 410 in the sync slot and to synchronize to SFR1 410 so it can calculate a timing offset and know when to start transmitting inbound voice and/or data on TS1 434.

In some embodiments, the frequency and timeslot assignment messages 526, 528 may be preceded by the transmissions of wake-up messages to each SFR to cause the SFRs to transition from a low-power or power saving mode to an active mode. Furthermore, while FIG. 5 illustrates the assignment messages 526, 528 occurring after the FDCallGrant message 522 is broadcast, in practice, the transmissions may occur in a different order or simultaneously.

At step 523, SU4 440 processes the FDCallGrant 522 message and proceeds to the frequency (frequency3 in this example) indicated in the FDCallGrant 522 message. Once on the assigned frequency (e.g., switching from the control channel frequency to frequency3), SU4 440 synchronizes with SFR3 416, perhaps by waiting for a sync portion of the outbound timeslot (TS1 444 in this example) broadcast by SFR3 416 on the assigned frequency, and once synchronized, can begin transmitting inbound voice and/or data in the next occurrence of the assigned timeslot (TS2 446 in this example) as set forth in the FDCallGrant 522 message.

Similarly, at step 525, the SU1 430 processes the FDCallGrant 522 message and proceeds to the frequency (frequency1 in this example) indicated in the FDCallGrant 522 message. Once on the assigned frequency (e.g., switching from the control channel frequency to frequency1), SU1 430 synchronizes with SFR1 410, perhaps by waiting for a sync portion of the outbound timeslot (TS2 436 in this example) broadcast by SFR1 410 on the assigned frequency, and once synchronized, can begin transmitting inbound voice and/or data in the next occurrence of the assigned timeslot (TS1 434 in this example) as set forth in the FDCallGrant 522 message.

In some embodiments, SFRs 1 410 and 3 416 may be time aligned, e.g., such that TS1 434 is time aligned with TS1 444 and TS2 436 is time aligned with TS2 446. In other embodiments, SFRs 1 410 and 3 416 may not be time aligned. In the example of FIG. 5, it is assumed that TS2 446 at SFR3 416 is time aligned with TS1 434 at SFR1 410 for ease of illustration. Furthermore, in the example of FIG. 5, it is assumed that SU1 430 and SU4 440 begin generating voice and/or data traffic at a same time, again, for ease of illustration. In other embodiments, the initiator of the full duplex call (SU4 440 in this case) may begin generating voice and/or data traffic for some period of time before the target of the full duplex call (SU1 430 in this case) begins adding its own voice and/or data traffic to the call.

As illustrated in the example in FIG. 5, SU4 440 begins generating voice and/or data traffic for the call and transmits its first message TS2_trafficA 530 in TS2 446 on its assigned frequency (frequency3 in this example) to SFR 3 416. At generally a same time, SU1 430 begins generating voice and/or data traffic for the call and transmits its first message TS1_trafficA 532 in TS1 434 on its assigned frequency (frequency1 in this case) to SFR1 410.

Upon receipt of the TS2_trafficA 530 and TS1_trafficA 532 messages, SFR3 416 and SFR1 410 forward the respective messages between one another via fwd_TS2_trafficA 533 and fwd_TS1_trafficA 534 messages. The SFRs 410, 416 may exchange these messages via, for example, network 120 of FIG. 4, which may be a fully or partially privately maintained network and/or fully or partially publicly maintained network such as the Internet.

Because there is some delay in routing the fwd_TS2_trafficA 533 and fwd_TS1 trafficA 534 messages between the SFRs 410, 416, it is unlikely that they would be available for the target SFRs to transmit in the immediate following adjacent timeslot from the TS on which the original TS2_trafficA 530 and TS1_trafficA 532 messages were received. Accordingly, and as illustrated in FIG. 5, TS1 536 between SU4 440 and SFR3 416 and TS2 538 between SU1 430 and SFR1 410 are unused for voice or data payload purposes (although, may be used for sync and/or control signaling purposes, among other possibilities) in this example.

During the next pair of immediately adjacent time slots at SFR3 416, SU4 440 continues generating voice and/or data traffic for the call and transmits its second inbound message TS2_trafficB 540 in TS2 446 on its assigned frequency to SFR3 416. At the very next timeslot on its assigned single frequency, SFR3 416 has the fwd_TS1_TrafficA 534 message available to transmit on the outbound TS1 444 to SU4 440, and does so via message fwd_TS1_trafficA 544.

Similarly, during the next pair of immediately adjacent time slots at SFR1 410, SU1 430 continues generating voice and/or data traffic for the call and transmits its second inbound message TS1_trafficB 542 in TS1 434 on its assigned frequency to SFR1 410. At the very next timeslot on its assigned single frequency, SFR1 410 has the fwd_TS2_TrafficA 533 message available to transmit on the outbound TS2 436 to SU1 430, and does so via message fwd_TS2_trafficA 546.

This pattern of transmitting voice and/or data on a first one of a plurality of N available timeslots between each SU and its respective SFR, and relying on the intermediate SFRs to exchange the transmitted voice and/or data and transmit the voice and/or data on a second one of the plurality of N available timeslots between each SU and its respective SFR, may continue until the call is completed. The call may be completed, for example, via explicit signaling received at the radio controller 422 from one or both of the SUs participating in the full duplex call, or from passage of a threshold amount of time without additional voice and/or data being received from either of the SUs participating in the full duplex call, among other possibilities.

In some embodiments, and with respect to the examples set forth above, SU4 440 and SFR3 416 may be replaced by dispatch console 424, such that a dispatch console operator may conduct a full duplex call with a target SU such as SU1 430. In this example, the dispatch console 424 could directly interface with the radio controller 422 via network 120, and would effectively take the place of SU4 440 of FIG. 5 for call setup (502-523) and take the place of SFR3 416 of FIG. 5 for conducting the call (530-546), with the caveat that messages 530, 536, 540, and 544 would be eliminated. All messaging between SFR1 410 and SU1 430 would be unaffected.

In addition to a trunked radio system, a full duplex call via intermediate SFRs could be implemented in a conventional, non-trunked, radio system as well. FIG. 6 sets forth a ladder diagram 600 illustrating example message transmissions and processing steps executable in a conventional, non-trunked, radio system such as radio system 400 of FIG. 5. For ease of describing the embodiments hereinafter, the digital conventional wireless communications system in which message transmissions and processing steps are illustrated in FIG. 6 is presumed to be a two time slot (2:1) TDMA conventional radio communications system in accordance with the ETSI-DMR 6.25e standard. Because the actual call transmission process is substantially the same between the trunked radio system of FIG. 5 and the conventional radio system of FIG. 6, only changes to the call setup process (e.g., 503-528 of FIG. 5) will be described with respect to the conventional system of FIG. 6. The call transmission process of FIG. 5 (e.g., 530-546) is incorporated in its entirety to this description of the conventional radio system for the actual call transmission process once the SFRs are setup in accordance with the forthcoming description.

FIG. 6 illustrates a full duplex individual call setup process in a conventional, non-trunked, radio system initiated by SU4 440 of FIG. 4, with SU1 430 indicated as an intended recipient of the full duplex call. Again, while multiple additional SUs may be able to receive or monitor the full duplex call (e.g., by monitoring time slots TS1 and TS2 at site 1 102 or site 2 104), the additional SUs would not be able to participate in the call due to the limited availability of time slots in this example. Accordingly, systems and devices involved in the full duplex individual call setup and transmission process include, but are not limited to, SU4 440, conventional repeater 602, radio controller 422, SFR3 416, SFR1 410, and SU1 430. In one embodiment, conventional repeater 602 may be a separate repeater from the SFRs illustrated in FIG. 4 that is dedicated to providing half duplex conventional channels for the respective radio sites 1 102 and/or 2 104. In other embodiments, conventional repeater 602 may transition to and act as one of the SFRs SFR1 410 or SFR3 416 for the full duplex call in response to receiving and granting the full duplex call request. Furthermore, while in this example a conventional repeater 602 is illustrated that provides conventional channel coverage over both radio sites 1 102 and 2 104 (which may be separate or fully or partially overlapping), in other embodiments, separate conventional repeaters may be installed at each radio site 1 102 and 2 104, and may coordinate SFR assignments, if necessary, for a requested full duplex call via a network such as network 120. Other possibilities exist as well.

At step 603, the SU4 440, perhaps while idling on a conventional channel provided by conventional repeater 602, detects a request for a full duplex call with SU1 430, perhaps received via an input interface of the SU4 440. In response to detecting the request, the SU4 440 generates and transmits a full duplex call request message (FD_Call_Req 604) on the conventional channel for receipt by conventional repeater 602. Conventional repeater 602 then forwards the request via a FWD_FD_Call_Req 606 message to radio controller 422, via a network connection such as network 120, or via an internal software function interface or an internal circuit element in the event that radio controller 422 is integrated with the conventional repeater 602.

At step 608, the radio controller 422 processes the FWD_FD_Call_Req 606 message, identifying the source SU4 440 identified in the request, the target SU1 430 identified in the request, and an indication that the call request is for a full duplex call (and not a half duplex call).

In one optional embodiment, the radio controller 422 may, at step 608 and prior to granting the request, confirm that the indicated target SU (SU1 430) is available and willing to accept the full duplex call, and that SFRs are available to conduct the full duplex call. In an embodiment in which specialized SFRs are reserved for full duplex calls, the radio controller 422 may determine whether reserved SFRs are available at each radio site involved in the full duplex call (or two SFRs at a single radio site in an embodiment in which radio site 1 102 and radio site 2 104 are the same radio site). In an embodiment where conventional half duplex repeaters are converted to SFRs for a full duplex call, the radio controller 422 must determine whether conventional half duplex repeaters (perhaps including conventional repeater 602) with two free timeslots are available to be converted to SFRs to support the full duplex call. In some embodiments, the radio controller 422 may track repeater usage and may be able to determine, itself, whether sufficient resources at SFRs are available to support the full duplex call. In other embodiments, the radio controller 422 may need to poll one or more conventional repeaters and/or SFRs to determine or verify that the RF resources are available.

For example, and as indicated in FIG. 6, the radio controller 422 may transmit an SFR request message (SFR3_request 610) to SFR3 416 to inquire whether it has sufficient resources to act as an SFR for the requested call. The SFR3_Request 610 may be transmitted between repeaters via a network, such as network 120 of FIG. 4, for example. If sufficient resources (2 time slots, in this example) are available at SFR3 416, it responds with an SFR3_ack 612 message acknowledging that sufficient resources are available. Similarly, the radio controller 422 may transmit an SFR request message (SFR1_request 614) to SFR1 410 to inquire whether it has sufficient resources to act as an SFR for the call. The SFR1_Request 614 may be transmitted between repeaters via a network, such as network 120 of FIG. 4, for example. If sufficient resources (2 time slots, in this example) are available at SFR1 410, it responds with an SFR1_ack 616 message acknowledging that sufficient resources are available.

In some embodiments, the SFR request messages may be preceded by the transmissions of wake-up messages to each SFR to cause the SFRs to transition from a low-power or power saving mode to an active mode.

To confirm that the indicated target SU1 430 is available for the call, and as illustrated in FIG. 6, the radio controller 422 may optionally transmit a full duplex target request message (FD_target_req 620/622) to SU1 430 via the conventional repeater 602 and conventional channel. In response to receiving the request, the SU1 430 may process the request at optional step 624. For example, SU1 430 may query its user via a display prompt and request the user to indicate whether to accept or reject the full duplex call. In other embodiments, SU1 430 may be configured to determine, automatically, and perhaps via consideration of the SU1's 430 operating environment, whether to accept or reject the call and respond accordingly.

In any event, and assuming that the SU1 430 user or SU1 430 itself determines to accept the call, it transmits a full duplex target acknowledgment message (FD_target_ack 626/628) on the conventional channel to radio controller 422 via conventional repeater 602. Radio controller 422 may then use the acknowledgment, or lack thereof, at step 629 in further determining whether to grant the requested full duplex call.

Assuming that the radio controller 422 determines that sufficient resources are available for the call (e.g., in this case, that SFR3 416 can operate on a single frequency having two immediately adjacent timeslots available for the full duplex call at radio site 104, and that SFR1 410 can operate on a single frequency having two immediately adjacent timeslots available for the full duplex call at radio site 102), the radio controller 422 causes a full duplex call grant message to be broadcast on the conventional channel (e.g., a FDCallGrant 630 message generated by radio controller 422 and broadcast by the conventional repeater 602 on the conventional channel as FDCallGrant 632). The FDCallGrant 630/632 message includes information populated by the radio controller 422 that identifies the frequency and time slots that each party to the full duplex call should receive and transmit on, respectively, for the duration of the full duplex call. For example, and using the radio system illustrated in FIG. 4, the FDCallGrant 630/632 may instruct SU4 440 to tune to frequency3 associated with SFR3 416 and to transmit voice and/or data to SFR3 416 on TS2 446 on frequency3 and to receive voice and/or data from SFR3 416 on TS1 444 on frequency3. Similarly, the FDCallGrant 630/632 may instruct SU1 430 to tune to frequency1 associated with SFR1 410 and to transmit voice and/or data to SFR1 410 on TS1 434 on frequency1 and to receive voice and/or data from SFR1 411 on TS2 436 on frequency1. Other possibilities exist as well. Once so instructed, the SUs (SU4 440 and SU1 430) may tune to the assigned frequency, and synchronize with their respective SFR via a synchronization code transmitted in an outbound sync slot from each SFR. The synchronization code identifies the slot in which it was transmitted, and using this information along with the assigned slot information and known timing of the channel, can begin transmitting and/or receiving in the corresponding correct time slot.

The radio controller 422 may also transmit frequency and timeslot assignment messages to each SFR involved in the full duplex call. For example, radio controller 422 may transmit SFR3_assign message 634 to SFR3 416 instructing SFR3 416 to tune to frequency3 and to transmit voice and/or data to SU4 440 on TS1 444 on frequency3 and to receive voice and/or data from SU4 440 on TS2 446 on frequency3. Immediately after tuning to frequency3, if not already tuned to frequency3, SFR3 may then begin broadcasting at least the sync portion of TS1 444 (see, for example, sync slot 216 of FIG. 2) that would allow the SU4 440, if not already synchronized to SFR3 416, to identify TS1 444 via its unique sync code transmitted by SFR3 416 in the sync slot and to synchronize to SFR3 416 so it can calculate an offset and know when to start transmitting inbound voice and/or data on TS2 446.

Similarly, radio controller 422 may transmit SFR1_assign message 636 to SFR1 410 instructing SFR1 410 to tune to frequency1 and to transmit voice and/or data to SU1 430 on TS2 436 on frequency1 and to receive voice and/or data from SU1 430 on TS1 434 on frequency1 Immediately after tuning to frequency1, if not already tuned to frequency1, SFR1 may then begin broadcasting at least the sync portion of TS2 436 that would allow the SU1 430, if not already synchronized to SFR1 410, to identify TS2 436 via its unique sync code transmitted by SFR1 410 in the sync slot and to synchronize to SFR1 410 so it can calculate an offset and know when to start transmitting inbound voice and/or data on TS1 434.

While FIG. 6 illustrates the SFR assignment messages 634, 636 occurring after the FDCallGrant message 632 is broadcast, in practice, the transmissions may occur in a different order or simultaneously.

At step 640, the SU4 440 processes the FDCallGrant 632 message and proceeds to the frequency (frequency3 in this example) indicated in the FDCallGrant 632 message. Once on the assigned frequency (e.g., switching from the conventional repeater frequency to frequency3), SU4 440 synchronizes with SFR3 416, perhaps by waiting for a sync portion of the outbound timeslot (TS1 444 in this example) broadcast by SFR3 416 on the assigned frequency, and once synchronized, can begin transmitting inbound voice and/or data in the next occurrence of the assigned timeslot (TS2 446 in this example) as set forth in the FDCallGrant 522 message.

Similarly, at step 642, the SU1 430 processes the FDCallGrant 632 message and proceeds to the frequency (frequency1 in this example) indicated in the FDCallGrant 632 message. Once on the assigned frequency (e.g., switching from the conventional repeater frequency to frequency1), SU1 430 synchronizes with SFR1 410, perhaps by waiting for a sync portion of the outbound timeslot (TS2 436 in this example) broadcast by SFR1 410 on the assigned frequency, and once synchronized, can begin transmitting inbound voice and/or data in the next occurrence of the assigned timeslot (TS1 434 in this example) as set forth in the FDCallGrant 522 message.

Further transmissions between SU4 440 and SU1 430 of FIG. 6 in conducting the full duplex call may be made commensurate with message transmissions and time slots 530-546 of FIG. 5.

In some embodiments, and with respect to the examples set forth above, SU4 440 and SFR3 416 of FIG. 6 may be replaced by dispatch console 424, such that a dispatch console operator may conduct a full duplex call with a target SU such as SU1 430. In this example, the dispatch console 424 could directly interface with the radio controller 422 via network 120, and would effectively take the place of the SU4 440 of FIG. 6 for call setup (603-642) and take the place of SFR3 416 of FIG. 5 for conducting the call (530-546), with the caveat that messages 530, 536, 540, and 544 would be eliminated. All messaging between SFR1 410 and SU1 430 would be unaffected.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling full duplex individual calls in repeater mode between two subscriber units in a N:1 slotting ratio time division multiple access (TDMA) radio system, the method comprising:
receiving, at a first repeater, a request for a full duplex individual call from a first subscriber unit identifying a second subscriber unit as a target of the full duplex individual call;
determining, by a radio controller associated with the first repeater, whether to grant or deny the request; and
responsive to determining to grant the request:
assigning, by the radio controller, a first time slot of the N time slots on a first single frequency for one of inbound and outbound transmissions for the full duplex individual call between an assigned second repeater and the first subscriber unit and a second time slot of the N time slots on the first single frequency for the other of inbound and outbound transmissions for the full duplex individual call between the assigned second repeater and the first subscriber unit; and
causing, by the radio controller, a grant message to be transmitted to the first subscriber unit indicating the assigned first single frequency and assigned first and second time slots.

2. The method of claim 1, further comprising:
wirelessly receiving, at the assigned second repeater, during one of the first time slot and the second time slot, an inbound transmission from the first subscriber unit and forwarding the inbound transmission to a third repeater for wireless transmission to the second subscriber unit; and
receiving, at the second repeater forwarded via the third repeater, an outbound transmission from the second subscriber unit and wirelessly transmitting, during the other of the first time slot and the second time slot, the outbound transmission to the first subscriber unit.

3. The method of claim 2, further comprising exchanging, by the second repeater, the inbound and outbound transmissions with the third repeater via a network connection coupling the second and third repeaters.

4. The method of claim 2, wherein the radio system is a conventional, non-trunked, radio system, the method further comprising determining, by the radio controller and prior to determining to grant the request, that the first and second time slots at the second repeater are available for the full duplex call, and that third and fourth time slots at the third repeater are available for the full duplex call.

5. The method of claim 4, wherein determining that the third and fourth time slots are available for the full duplex call comprises the radio controller transmitting an inter-repeater full duplex call request message to the third repeater identifying the second subscriber device and receiving, in response, an acknowledgement indicating availability of the third and fourth time slots at the third repeater.

6. The method of claim 5, wherein the radio controller is integrated with the first repeater and the second and third repeaters are single frequency repeaters reserved for full duplex calls, and wherein the radio controller is further configured to transmit wake-up messages and single frequency repeater peer information to the second and third repeaters responsive to determining to grant the request.

7. The method of claim 2, wherein the first, second, and third repeaters are within a same or at least partially overlapping geographic coverage area.

8. The method of claim 2, wherein the second and third repeaters are located in separate, non-overlapping geographic coverage areas.

9. The method of claim 1, wherein the first repeater and the second repeater are the same repeater, the same repeater transitioning from a first half duplex mode to a second full duplex mode for the full duplex call.

10. The method of claim 1, further comprising, responsive to receiving and granting the request for the full duplex individual call, the first repeater transitioning from a conventional repeater mode supporting N separate inbound half duplex calls and no full duplex calls on the first single frequency to a single frequency repeater mode supporting N−2 separate inbound half duplex calls and one full duplex call.

11. The method of claim 1, further comprising determining, by the radio controller and prior to determining to grant the request, that the first and second time slots are available for the full duplex call.

12. The method of claim 11, wherein the first and second time slots are immediately adjacent time slots on the first single frequency.

13. The method of claim 1, wherein the radio system is a trunked radio system, the request is received on a control channel of the trunked radio system associated with the first repeater, and the second repeater and the first single frequency are selected by the radio controller for the full duplex call out of a pool of a plurality of repeaters and frequencies, the method further comprising:
assigning, by the radio controller, a first time slot of N time slots on a second single frequency for one of inbound and outbound transmissions for the full duplex individual call between an assigned third repeater and the second subscriber unit and a second time slot of the N time slots on the second single frequency for the other of inbound and outbound transmissions for the full duplex individual call between the assigned third repeater and the second subscriber unit; and
causing, by the radio controller, the grant message to be transmitted to both the first and the second subscriber unit via the control channel, the grant message further indicating the assigned second single frequency and assigned first and second time slots for the second subscriber unit.

14. The method of claim 13, further comprising, responsive to receiving and granting the request for the full duplex individual call, the radio controller selecting the second and third repeaters from a pool of single frequency repeaters reserved for full duplex calls.

15. The method of claim 1, wherein N is 2 and the guard interval between the first and second time slots and between the second and first time slots is less than or equal to 2.5 ms.

16. The method of claim 1, wherein the radio controller is integrated with the first repeater.

17. A radio controller device for enabling full duplex individual calls in repeater mode between two subscriber units in a N:1 slotting ratio time division multiple access (TDMA) radio system, the device comprising:
   a transceiver;
   a memory; and
   a processor configured to:
      receive, via a first repeater and the transceiver, a request for a full duplex individual call from a first subscriber unit identifying a second subscriber unit as a target of the full duplex individual call;
      determine whether to grant or deny the request; and
      responsive to determining to grant the request:
         assign a first time slot of the N time slots on a first single frequency for one of inbound and outbound transmissions for the full duplex individual call between an assigned second repeater and the first subscriber unit and a second time slot of the N time slots on the first single frequency for the other of inbound and outbound transmissions for the full duplex individual call between the assigned second repeater and the first subscriber unit; and
         cause a grant message to be transmitted, via the transceiver and the first repeater, to the first subscriber unit indicating the assigned first single frequency and assigned first and second time slots.

18. The device of claim 17, wherein the processor is further configured to:
   assign a first time slot of N time slots on a second single frequency for one of inbound and outbound transmissions for the full duplex individual call between an assigned third repeater and the second subscriber unit and a second time slot of the N time slots on the second single frequency for the other of inbound and outbound transmissions for the full duplex individual call between the assigned third repeater and the second subscriber unit; and
   cause a grant message to be transmitted, via the transceiver and first repeater, to the second subscriber unit indicating the assigned second single frequency and first and second time slots assigned thereon.

19. The device of claim 18, wherein the processor is further configured to determine, prior to determining to grant the request, that the first and second time slots at the second repeater are available for the full duplex call, and that third and fourth time slots at the assigned third repeater are available for the full duplex call.

20. The device of claim 17, wherein the radio controller is integrated with the first repeater.

21. A method for enabling full duplex individual calls in repeater mode between a dispatch console and a subscriber unit in a N:1 slotting ratio time division multiple access (TDMA) radio system, the method comprising:
   receiving, at a radio controller, a request for a full duplex individual call from a dispatch console identifying a first subscriber unit as a target of the full duplex individual call;
   determining, by the radio controller, whether to grant or deny the request; and
   responsive to determining to grant the request:
      assigning, by the radio controller, a first time slot of the N time slots on a first single frequency for one of inbound and outbound transmissions for the full duplex individual call between an assigned first repeater and the first subscriber unit and a second time slot of the N time slots on the first single frequency for the other of inbound and outbound transmissions for the full duplex individual call between the assigned first repeater and the first subscriber unit; and
      causing, by the radio controller, a grant message to be transmitted to the first subscriber unit indicating the assigned first single frequency and assigned first and second time slots.

22. The method of claim 21, further comprising:
   wirelessly receiving, at the assigned first repeater, during one of the first time slot and the second time slot, an inbound transmission from the first subscriber unit and forwarding the inbound transmission to the dispatch console; and
   receiving, at the first repeater, an outbound transmission from the dispatch console and wirelessly transmitting, during the other of the first time slot and the second time slot, the outbound transmission to the first subscriber unit.

23. The method of claim 21, wherein the radio controller is integrated within the first repeater.

* * * * *